United States Patent [19]

Murray et al.

[11] Patent Number: 5,684,821
[45] Date of Patent: Nov. 4, 1997

[54] MICROWAVE EXCITED LASER WITH UNIFORM GAS DISCHARGE

[75] Inventors: Michael W. Murray, Palm City; Kevin M. Dickenson, Jupiter, both of Fla.

[73] Assignee: Lite Jet, Inc., Jupiter, Fla.

[21] Appl. No.: 449,423

[22] Filed: May 24, 1995

[51] Int. Cl.$^6$ ............................................. H01S 3/097
[52] U.S. Cl. ................................ 372/84; 372/82; 372/83
[58] Field of Search ................................ 372/82, 83, 84

[56] References Cited

U.S. PATENT DOCUMENTS

| | | |
|---|---|---|
| 4,217,560 | 8/1980 | Kesyrev et al. . |
| 4,759,029 | 7/1988 | Seunik et al. . |
| 4,780,881 | 10/1988 | Zhang et al. . |
| 4,890,294 | 12/1989 | Nishimae et al. ........................ 372/82 |
| 4,926,434 | 5/1990 | Ross . |
| 4,987,577 | 1/1991 | Seunik et al. ........................... 372/82 |
| 5,347,530 | 9/1994 | Gekat et al. . |
| 5,359,621 | 10/1994 | Tsunoda et al. ......................... 372/82 |
| 5,361,274 | 11/1994 | Simpson et al. ......................... 372/82 |
| 5,379,317 | 1/1995 | Bridges et al. . |
| 5,412,684 | 5/1995 | Schlie et al. ............................ 372/82 |

Primary Examiner—Rodney B. Bovernick
Assistant Examiner—Robert E. Wise
Attorney, Agent, or Firm—Pennie & Edmonds LLP

[57] ABSTRACT

A microwave excited laser using a sealed CO2 gas mixture for the laser medium. The laser has means for producing a uniform discharge throughout the length of the laser by using a plurality of actuators that adjust the electrical field along a deformable waveguide. The microwave waveguides are dimensioned so that the electric field is operating at or just above cut-off. A terminating cavity maintains gas discharge throughout the full length of the laser.

32 Claims, 8 Drawing Sheets

MICROWAVE EXCITED LASER WITH UNIFORM GAS DISCHARGE

TECHNICAL FIELD OF THE INVENTION

The present invention relates to microwave excited lasers, and more particularly, to a microwave excited CO2 gas laser and method for providing a uniform discharge throughout the full length of the laser.

BACKGROUND OF THE INVENTION

Since the invention of gas discharge lasers, various excitation methods have been used. The most obvious and easiest method was the direct current, or DC discharge, which used metal electrodes enclosed in a gas tight vessel that was in direct contact with the laser gas. However, this technique had the drawback of requiring very high voltages with lengthy laser tubes. Interactions between the electrodes and the gas also tended to reduce the lifetime of the sealed laser tubes.

The most serious electrode and gas interaction was chemical reactions and cathode sputtering. The chemical reactions with the laser electrodes changed the chemical composition of the gas mixture, which degrades or completely stops laser performance.

Sputtering is a process where cathode material is deposited on surfaces within the gas discharge vessel. The sputtering process is particularly adverse to the laser's efficiency when the cathode material is deposited onto the laser mirror surface; this will usually prohibit the laser from functioning altogether.

To overcome the DC excitation method limitations, radio frequency, or RF power has been utilized to breakdown and excite the laser gas, otherwise known as gas discharge.

Early gas lasers used RF excitation by coupling an oscillating electromagnetic field, either capacitively or inductively, through the insulating walls of a gas tight vessel. However, the use of RF power requires an expensive power source since a DC power supply, an RF amplifier, and the associated components are required.

A more economical means for excitation utilizes microwave energy. The short wavelengths associated with electromagnetic excitation energy require that the microwaves be confined in an enclosed metal structure to prevent the loss of microwave power by radiation to the environment. The best design for the enclosed metal structure is to make the structure resonant at the microwave operating frequency, so as to produce an intense discharge in the laser gas with less microwave power loss in the metal walls of the enclosure.

A structure of this type is known as a microwave resonate cavity, or a waveguide with end walls. A waveguide with end walls is a microwave resonate cavity when the end walls are spaced an integer multiple of one-half waveguide wavelengths apart. Such resonate cavities, or waveguides have fixed standing wave patterns that are determined by the dimensions of the cavity and the wavelength of the microwaves.

Standing wave patterns in microwave cavities or waveguides always have zero electric field strength at the walls of the waveguide since the walls short circuit the electric field. The electric field increases from zero at locations away from the walls. However, if the cavity is large enough, the electric field will decrease to zero at points that are approximately one-half wavelength away from the cavity wall. A standing wave pattern in a large waveguide would have many locations where the electric field strength would always be zero, and as a result, no gas discharge could exist at those locations.

Therefore, microwave excitation is inherently non-uniform since where the electric field is strongest, the gas would be over pumped, and one-quarter wavelength away the gas would not be pumped at all. This characteristic is particularly inefficient for pumped level dependant lasers, such as carbon dioxide (CO2) lasers, because these lasers actually have negative gain in regions of the laser gas where the gas is over pumped.

Large scale mass production of magnetrons for commercial microwave ovens has reduced the cost of magnetrons to be significantly less than the cost of an average RF power source of equal power.

The difficulty of utilizing the lower cost magnetron power supply is creating gas discharge uniformity, which is critical because localized over pumping and heating of the laser gas produces regions with negative gain, which reduces or destroys laser performance.

CO2 gas lasers have an optimum level of pumping and an efficient CO2 laser will achieve the optimum pump level along the entire gain length of the laser. The prior art microwave lasers do not achieve discharge uniformity and can only operate as fast flowing gas lasers, where the gas flows through the optical cavity so that the gas is not over heated.

Other prior art microwave lasers rely on pulsed microwave discharges with short pulse durations to avoid localized over heating of the laser gas, yet the discharge is non-uniform and inefficient.

Prior U.S. Patents have addressed the issue of utilizing magnetrons as a laser power source and the inherent problems with using microwave power.

For example, U.S. Pat. No. 5,379,317 issued to Bridges et al. utilizes a microwave excited slab waveguide laser to take advantage of mass produced magnetrons and to reduce the cost of the microwave excited laser.

U.S. Pat. No. 4,926,434 issued to Ross discloses a short circuit element and an ignitor for a microwave excited laser. However, this particular design maximizes the electric field strength at the far end of the waveguide, which would produce a non-uniform gas discharge.

U.S. Pat. No. 5,347,530 issued to Gekat et al. utilizes a short circuit plate with a ring electrode to terminate the main waveguide and discharge tube assembly. However, this design will result in an electric field having zero strength, or a standing wave, at the short circuit plate, and therefore, no discharge will occur at that area.

U.S. Pat. No. 4,780,881 issued to Zhang et al. discloses a laser utilizing a metallic short circuit and an ignitor as a way of starting and maintaining a discharge in the laser.

U.S. Pat. No. 4,217,560 issued to Kosyrev et al. discloses an adjusting screw in direct contact with an electrode to compensate for changes in the electric characteristics of the laser.

U.S. Pat. No. 4,759,029 issued to Siemens attempts to address the issue of gas discharge non-uniformity by using a large number of discrete adjustable electrodes; however, due to the configuration of the waveguides, which are terminated by open circuits, the laser will have a standing wave pattern. The adjustable electrodes of this design will not prevent under pumped areas (dark spots) in the gas discharge volume.

Furthermore, U.S. Pat. No. 4,759,029 has practical limitations because the discrete electrodes have a plurality of sharp edges. The discrete sharp edges of this disclosure promote microwave arcing in the air volume internal of the cavity, which creates an unreliable and inefficient laser operation. The discrete nature of the electrodes create gas discharge non-uniformity. The use of a large number of electrodes is also not economical and is impractical due to the large number of individual adjustments that would be required to tune the laser while attempting a uniform gas discharge.

What is needed is a laser that utilizes the efficiency and economy of microwave excitation while having the capability of producing a uniform discharge of the laser gas throughout the full length of the laser.

DISCLOSURE OF THE INVENTION

It is, therefore, an object of the present invention to provide a laser that produces a uniform gas discharge throughout the full length of the laser.

It is also an object of the present invention to provide a microwave excited laser that produces a uniform gas discharge throughout the full length of the laser.

It is also an object of the present invention to provide a microwave excited laser that operates at or slightly above cut-off so that there is an electrical field throughout the full length of the gas discharge area.

It is also an object of the present invention to provide a microwave excited laser with a sealed gas discharge vessel.

It is also an object of the present invention to provide a microwave excited laser that is compact in design, while having a relatively high energy output laser beam.

It is also an object of the present invention to provide a microwave excited laser that utilizes economical and readily available magnetrons as the power source.

According to the present invention, a microwave excited laser is disclosed that provides a uniform gas discharge along the full length of the laser. The gas discharge takes place internal of a dielectric gas discharge vessel, which is located internal of a microwave waveguide. The waveguide is dimensioned to be at or slightly above the electrical field cut-off point. At least one magnetron power supply feeds microwaves from a magnetron launcher into at least one waveguide.

Each waveguide has a deformable wall so that adjustments may be made along the deformable wall with a smooth transition between the adjustments. A plurality of ridges extend from the deformable wall towards the gas discharge vessel to form a waveguide internal ridge. The actuators are adjusted to displace the deformable wall, which in turn displaces the internal ridge. The deformable wall allows the microwave electric field strength to be adjusted along the full length of the laser. The adjustments increase or decrease the microwave current coupled to the dielectric gas discharge vessel so that the intensity of the gas discharge may be adjusted to be uniform throughout the full length of the laser.

The gas discharge may be initialized, or ignited, by the deformable wall at the microwave source end of the waveguide. This ignition method concentrates the microwave power temporarily at one location at the dielectric vessel so that breakdown of the laser gas, or gas discharge, will begin at that location. After breakdown of the gas at the ignition location, the deformable wall resumes the nominal operating position so that a uniform gas discharge occurs at the initial ignition location and throughout the full length of the laser.

A terminating cavity is located at the low power end, or terminating end of the microwave waveguide. The terminating cavity allows the magnitude of the electrical field to remain positive throughout the full length of the waveguide and therefore, maintains a certain electrical field strength throughout the length of the laser. The terminating cavity prevents the electric field from short circuiting at an end wall in the waveguide. The terminating cavity provides sufficient electric field strength at the end of the waveguide so as to have gas discharge throughout the full length of the laser. The terminating cavity also has an adjustable wall so that the electric field may be adjusted or fine tuned throughout the length of the laser.

In a separate embodiment, the dielectric vessel is located slightly off axis at the magnetron end, or the high power end of a waveguide to improve discharge uniformity.

In yet another separate embodiment, a dielectric vessel is housed in a transitioning shield structure internal of a waveguide. The shield may be a groove in the waveguide or may be a shield structure extending from the waveguide. The transitioning shield would only partially expose the dielectric vessel to the microwave field at the microwave source end, and would fully expose the dielectric vessel to the microwave field at the opposite end, where the microwave field would have less intensity. The dielectric vessel and the transitioning shield may be located off axis from the waveguide to further produce a uniform discharge.

The laser of the present invention provides a laser utilizing a low cost microwave power supply, while overcoming the problems of the prior art, that is, producing a uniform discharge in a microwave excited laser.

The foregoing and other advantages of the present invention will become more apparent from the following description and accompanying drawings.

BEST MODE FOR CARRYING OUT THE INVENTION:

According to the present invention a laser is disclosed that utilizes microwave power to excite gas in a dielectric vessel to produce a uniform gas discharge throughout the full length of the laser and to produce coherent light.

Figure 1:
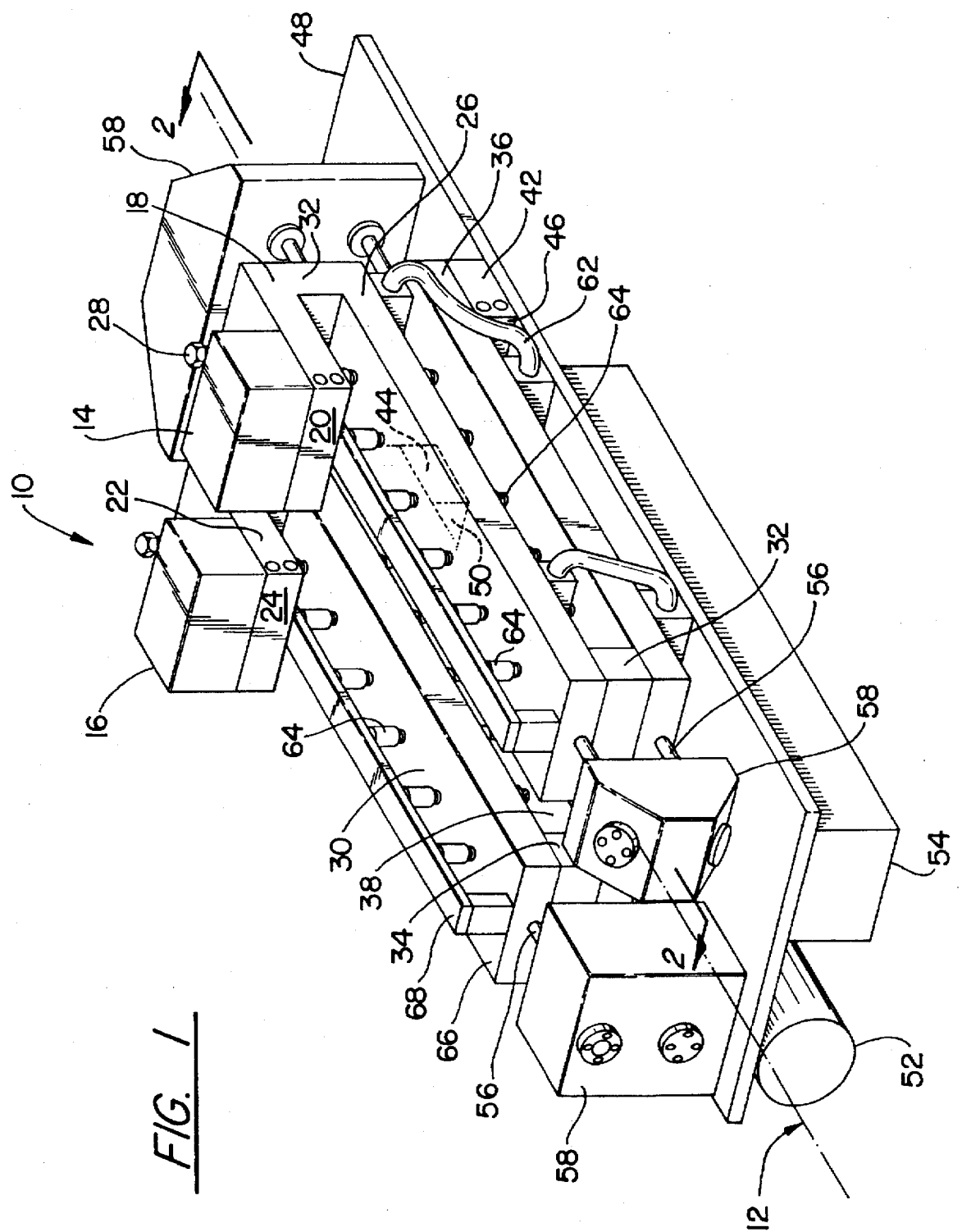
FIG. 1 is a perspective view of a preferred embodiment of a laser of the present invention.

In the preferred embodiment, and as shown in FIG. 1, a laser 10 has a major longitudinal axis 12 and utilizes a first magnetron 14 and a second magnetron 16 as the supply for providing an electric field along the length of the laser 10.

Figure 2:
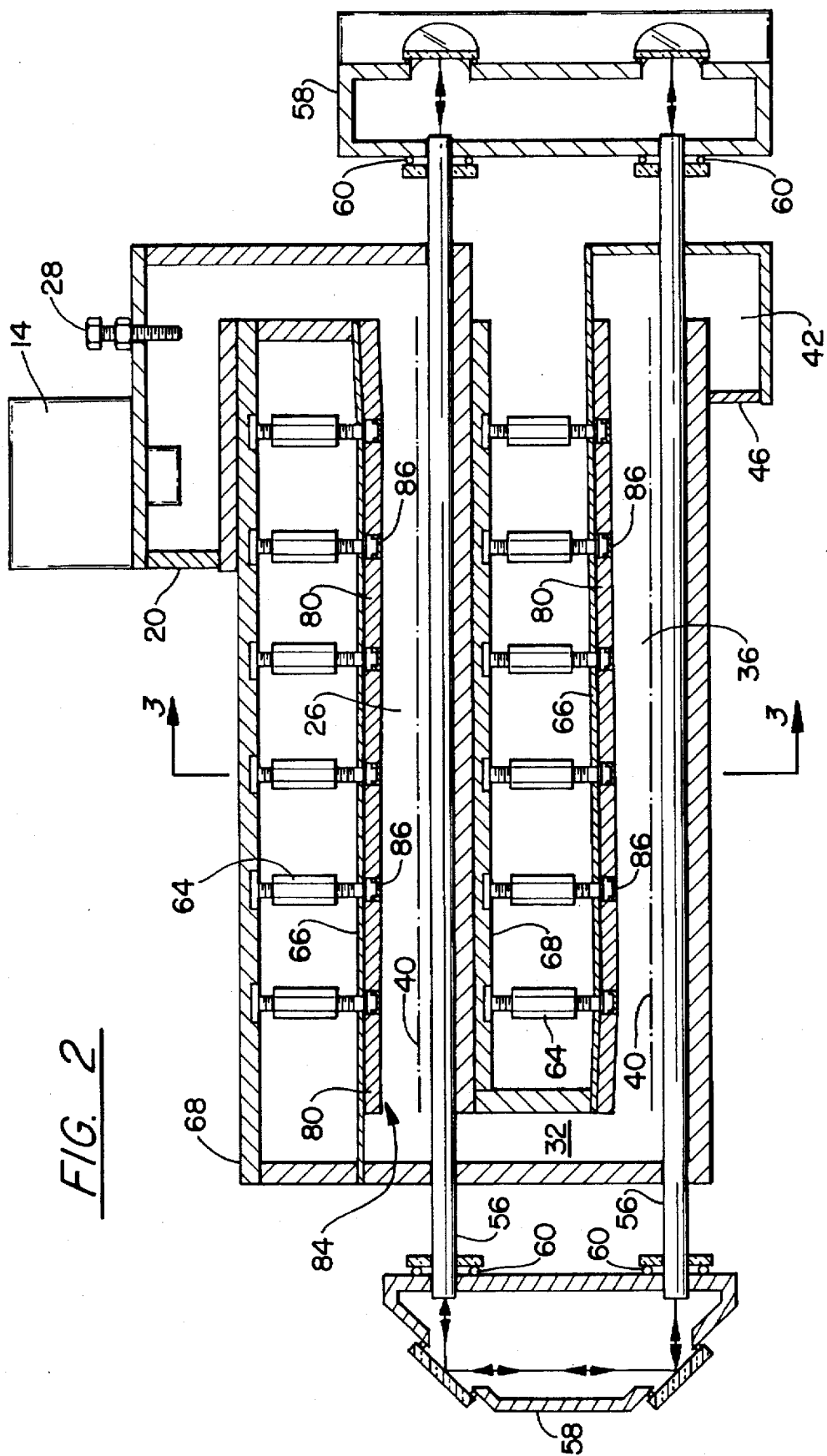
FIG. 2 is a cross sectional view taken along line 2—2 of FIG. 1.

As shown in FIG. 1 and FIG. 2, the microwaves propagate from the magnetrons to a first microwave launcher 18 and a second microwave launcher 22.

The first microwave launcher 18 has an adjustable wall 20 and the second microwave launcher 22 has an adjustable wall 24. The walls 20 and 24 may be adjusted to adjust and to fine tune the microwave electric energy at the launcher region of the laser 10. The adjustable walls 20 and 24 then may be set into position with set screws through the walls of the launchers 18 and 22.

A second adjustment on the launchers 18 and 22 is a tuning bolt 28, which is threaded into the top of each launcher and is approximately one-quarter wavelength away from the center of each magnetron 14 and 16.

Microwave energy propagates from the microwave launchers 18 and 22 to a first upper waveguide 26 and to a second upper waveguide 30 respectively.

The microwave energy propagates from the upper waveguides 26 and 30 into a first interconnecting waveguide 32 and second interconnecting waveguide 34 respectively. The microwave energy further propagates to a first lower waveguide 36 and a second lower waveguide 38, which are connected to the interconnecting waveguides 32 and 34.

Each waveguide has a waveguide longitudinal axis 40 that extends along the length of the waveguide. The waveguide longitudinal axis 40 is located at the center of the width of each waveguide and is parallel with the laser major longitudinal axis 12.

Each waveguide is also dimensioned to be at, or slightly above the microwave electric field cut-off point, therefore, an electric field is experienced throughout the full length of the laser 10.

The microwave energy propagates from the lower waveguides 36 and 38 to a first terminating microwave cavity 42 and a second terminating microwave cavity 44. The terminating cavities 42 and 44 serve to terminate or prevent short circuiting of the microwave electric field, therefore, an electric field is experienced throughout the length of the waveguides.

The first terminating cavity 42 has an adjustable wall 46 and the second terminating cavity 44 has an adjustable wall 50. Each adjustable wall 46 and 50 is adjustable along the laser longitudinal axis 12 so that microwave electric energy may be adjusted at the terminating end of the waveguides. The adjustable walls may be set into position after adjustment by using set screws.

The terminating cavities 42 and 44, as well as the laser in general, are mounted on a main support 48.

Also mounted to the main support 48 is a gas ballast tank 52, which generally provides additional gas volume to the laser 10, and a magnetron power supply 54, which provides power to the laser 10, and more particularly, to the magnetrons 14 and 16.

Each upper and lower waveguide has a dielectric gas discharge vessel 56 that extends longitudinally through the waveguide, the gas discharge vessel is aligned with and parallel to the waveguide longitudinal axis 40. At the end of each dielectric vessel is either a totally reflecting mirror or a partially reflecting mirror at the output location.

In the preferred embodiment, an optical system for the laser comprises four dielectric gas discharge vessels 56 that terminate at three different mirror mount structures 58.

An arrangement of totally reflecting mirrors are used, which are angled at 45 degrees so as to reflect the coherent light 90 degrees from the waveguides to the partially reflecting mirror at the laser beam output location. The arrangement of the mirrors allow the laser beam to intensify in strength as the beam passes through each of the dielectric gas discharge vessels, or optical waveguides.

The mirror mount structures 58 are gas tight with O-ring seals 60 fitted around the mirrors as well as the dielectric gas discharge vessels 56. The mirror mount structures 58 are connected to the gas ballast volume tank 52 to extend the duration of the sealed gas mixture between maintenance intervals.

The optical system of the laser 10 is cooled by a circulating cooling system that utilizes water circulating through cooling tubes 62 that are connected to the laser 10. The cooling system prevents the optical system from bending and warping due to the heat generated in the dielectric gas discharge vessels 56 and by the magnetron power supply 54.

Figure 4:
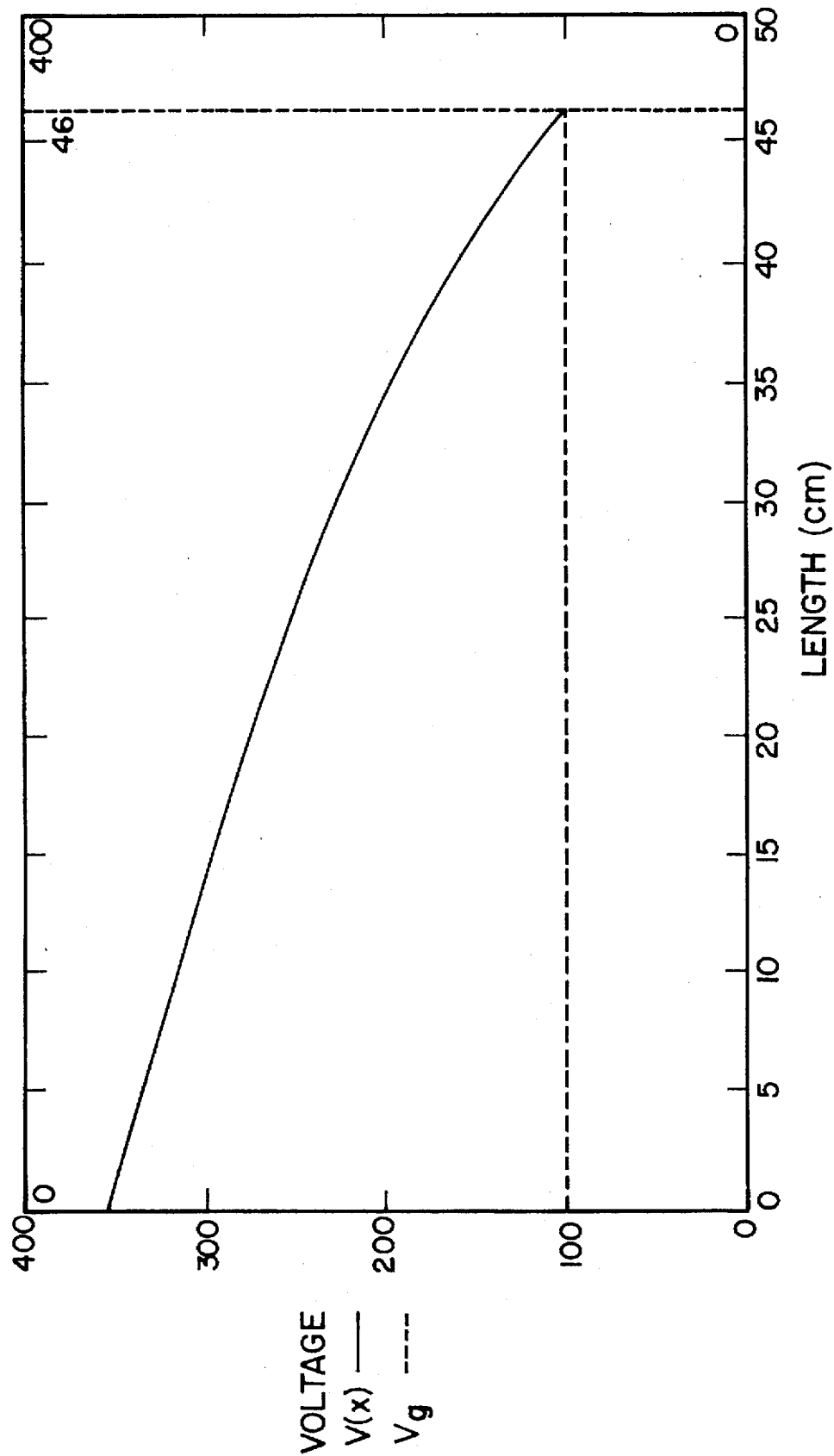
FIG. 4 is a graph representing the voltage throughout the length of a waveguide of the present invention.
Figure 5:
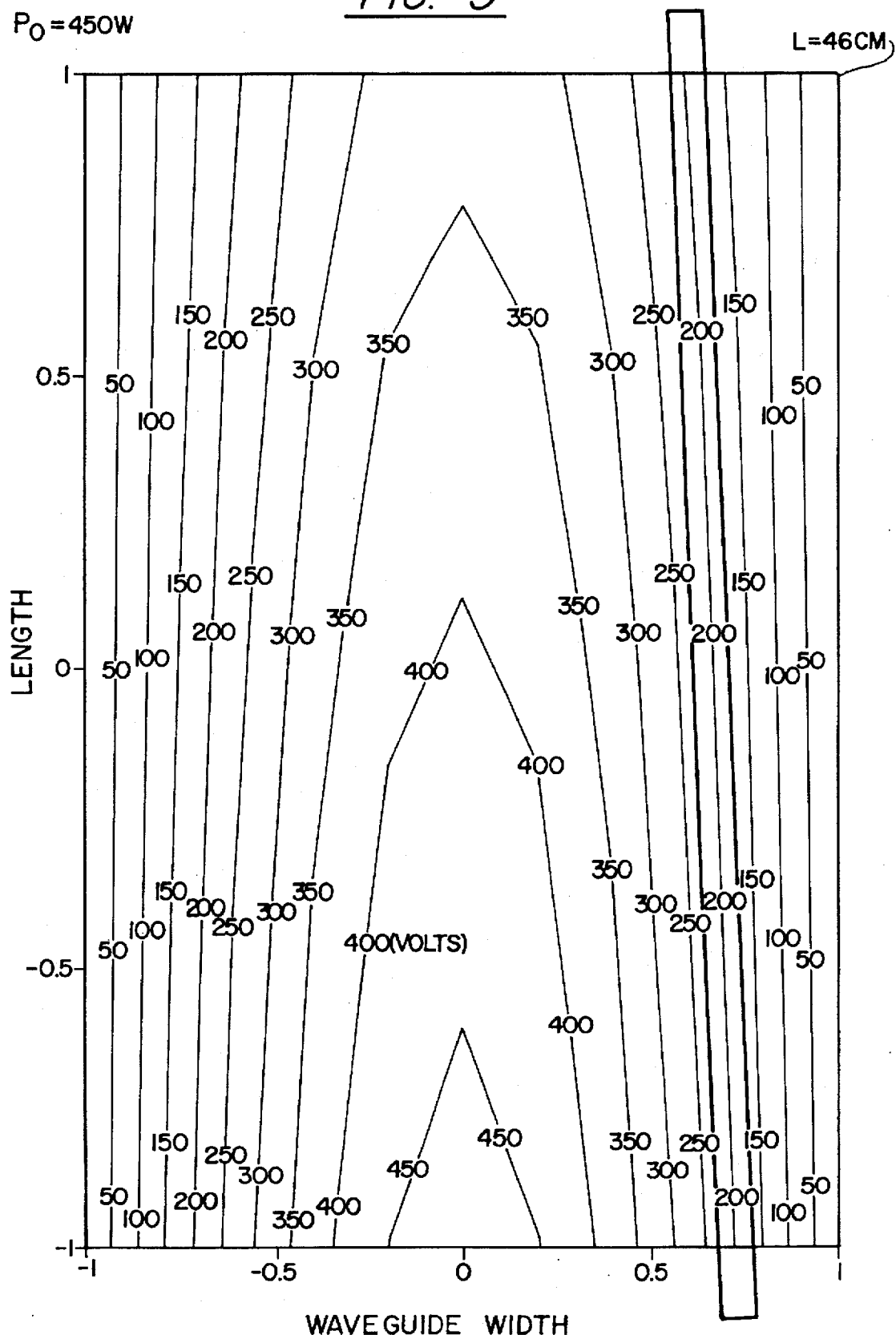
FIG. 5 is a graph representing the voltage throughout the width and length of the waveguide of the present invention.

As shown in FIGS. 4 and 5, in the laser of the present invention, microwave energy from at least one magnetron is utilized, and the voltage across the waveguides are inherently non-uniform. The voltage is relatively high at the waveguide portion that is adjacent to the magnetron, and the voltage across the waveguides is relatively low when compared to the magnetron end at the terminating cavity ends.

FIG. 4 shows the voltage along the length of the waveguide, and FIG. 5 shows a top view looking down on a waveguide with the varying voltages across the waveguide.

In the present invention, the non-uniform discharge in the dielectric gas discharge vessels is prevented by a plurality of actuators 64 spaced along the length of each waveguide and directly above each dielectric gas discharge vessel.

Figure 3:
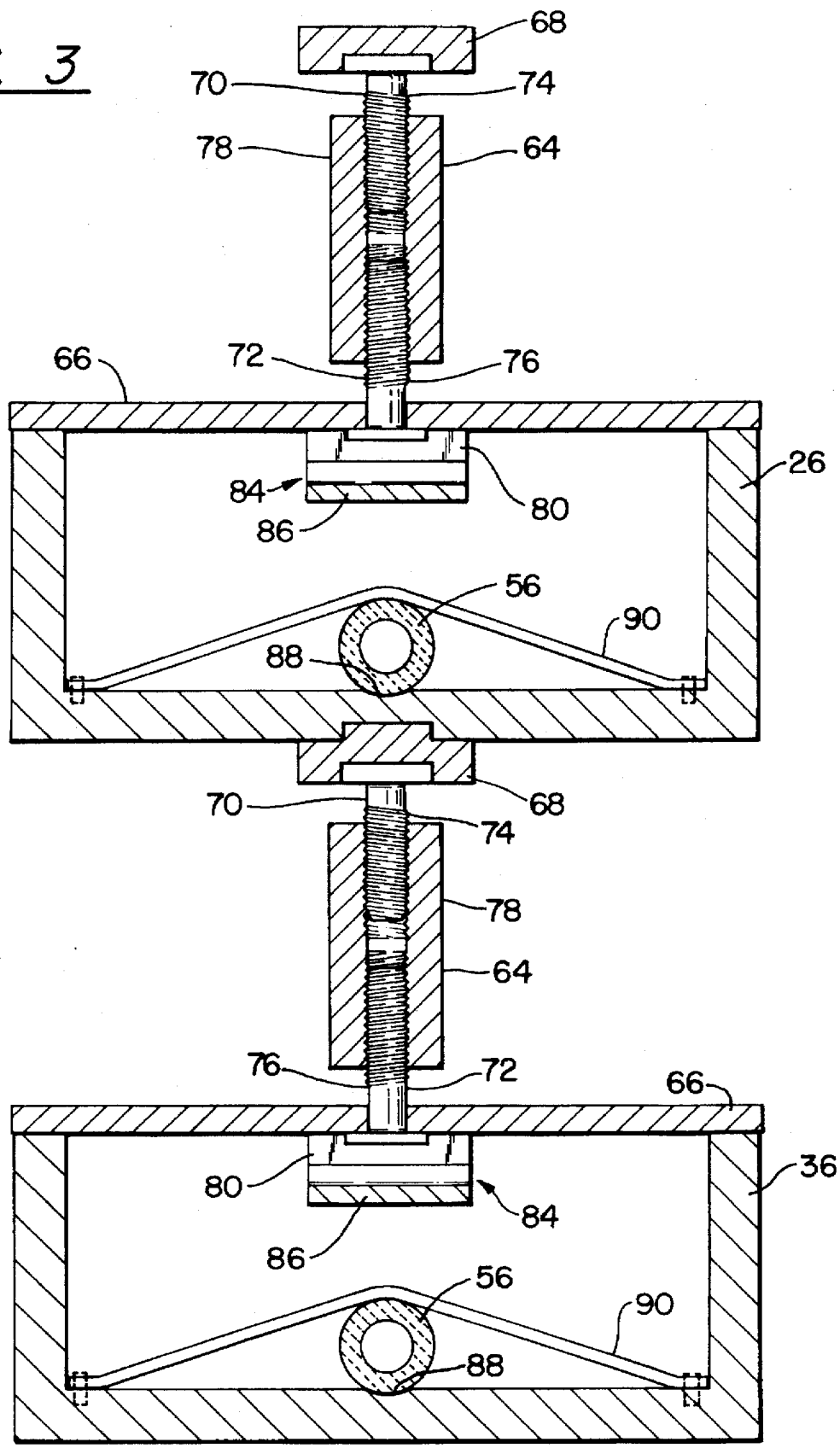
FIG. 3 is a cross sectional view taken along line 3—3 showing one of the waveguides of FIG. 2.

As shown in FIGS. 2 and 3, the waveguides each have a deformable waveguide wall 66 that extends longitudinally along the length of each waveguide and spaced approximately two inches apart from each other. The actuators 64 are fixedly attached to a support bar 68 at an actuator first end 70 and to the deformable waveguide wall 66 at an actuator second end 72.

Each support bar 68 is external of a waveguide and extends longitudinally along each waveguide.

An actuator first threaded portion 74 extends from the first end 70 and an actuator second threaded portion 76 extends from the second end 72. A threaded coupling 78 engages the threads of the first and second threaded portions 74 and 76 so that as one of the threaded couplings 78 is rotated, the second threaded portion 76 displaces the deformable waveguide wall 66.

The actuators 64 may be either mechanically adjusted by the laser operator or may be electrically adjusted with electric servo-motors.

A plurality of blocks 80 combine to comprise a longitudinal ridge 84 internal of each waveguide. The ridge 84 extends from the deformable wall 66 towards the dielectric vessel 56. The blocks 80 are parallel with and adjacent to the dielectric vessel 56 so as to intensify the amount of coupling between the deformable wall 66 and the dielectric vessel 56.

The blocks 80 are segmented to allow movement of each block relative to the adjacent block. The blocks 80 are securely fastened to the deformable wall 66, so as the deformable wall 66 is adjusted and displaced by the actuators 64, the blocks that are rotatably attached to that particular portion of the deformable wall 66 are displaced accordingly.

The segmentation of the blocks 80 are aligned with the actuators 64 so that as the deformable wall 66 is displaced, the adjacent pair of blocks 80 are displaced in tandem so there is a smooth transition between each block even during and after displacement by the actuators 64.

Further, the blocks 80 are of sufficient length so as to provide a smooth and continuous coupling adjustment relative to the dielectric vessel 56.

Finger stock 86, foil stock, or other flexible conductive material, connects each block 80 to the adjacent block 80 to provide a continuous and interrupted ridge 84. The flexible stock 86 provides a smooth transition and an electrical contact between each block. The finger stock 86 may be soldered or mechanically attached onto each block 80.

Each waveguide has a dielectric vessel recess 88 that is parallel to and aligned with the waveguide longitudinal axis 40. Each dielectric vessel 56 is housed in one of the waveguide dielectric vessel recesses 88 so that the recess 88 properly aligns the dielectric vessel 56 along the waveguide longitudinal axis 40. The proper alignment positions the dielectric vessel 56 directly adjacent to the adjustable ridge 84. The recess 88 also helps to prevent thermal deformation of the dielectric vessel 56 during the gas discharge process.

A plurality of dielectric polyamide lateral cross securing members 90 extend across the width of each waveguide and directly across the top of each dielectric vessel 56. Each of the cross members are fastened securely to the internal of the waveguides. The cross members 90, when not fastened to the waveguides, are generally straight pieces of flexible polyamide. When the cross members 90 are fastened to each waveguide, the cross members 90 exert a force against the entrapped dielectric vessel 56 accordingly. The cross members 90 and the waveguide recesses 88 combine together so that the entrapped dielectric vessel 56 thermally deforms along the waveguide longitudinal axis 40 during the gas discharge process. Any interruption of the electric field in the waveguide at each cross member 90 area may be adjusted by displacing the deformable wall 66 and ridge 84 with the actuators 64.

The actuators 64 adjust the amount of electric coupling between the deformable waveguide wall and the dielectric gas discharge vessel. The actuators 64 also are designed to be adjusted independently along the length of each waveguide so that the microwave energy is uniformly distributed in each of the dielectric gas discharge vessels.

A laser utilizing the actuators 64 of the present invention described above has been successfully operated with a 2.45 GHz microwave magnetron of the type found in commercial microwave ovens and with a gas composition comprising approximately 12% carbon dioxide, 12% nitrogen, and 76% helium, although other variations or combinations of gasses may also be successfully employed with the present invention. The use of 2.45 GHz magnetrons allows the present invention to utilize readily available, mass produced, and low cost magnetrons as the laser power supply.

A laser using alumina ceramic tubes for the dielectric gas discharge vessels has successfully been made and operated. In the preferred embodiment, the laser utilizes alumina ceramic tubes with folding mirrors so that the overall laser assembly is compact and modular in design.

Further, the preferred embodiment disclosed produces a spatially filtered optical laser beam of light as an output. The laser light leaves one alumina tube, is folded by two mirrors, and sent into the next alumina tube. High order transverse energy is lost in favor of the lowest order mode. The lowest order mode is the desired output mode and is characterized by having most of its energy near the optic axis of the gas discharge vessel, or optical cavity. High order modes tend to have more energy distributed farther away from the optic axis, therefore, the apertures of the alumina pipes act as optical spatial filters to remove the higher order mode energy; therefore, the folded microwave waveguide structure of the preferred embodiment acts as an optical spatial filter to remove high order mode energy from the optical cavity.

A second embodiment of the present invention is similar to the preferred embodiment described above, except that the second embodiment utilizes a symmetrical and opposing magnetron arrangement to comprise a smaller and more compact laser when compared to the preferred embodiment described above.

Figure 6:
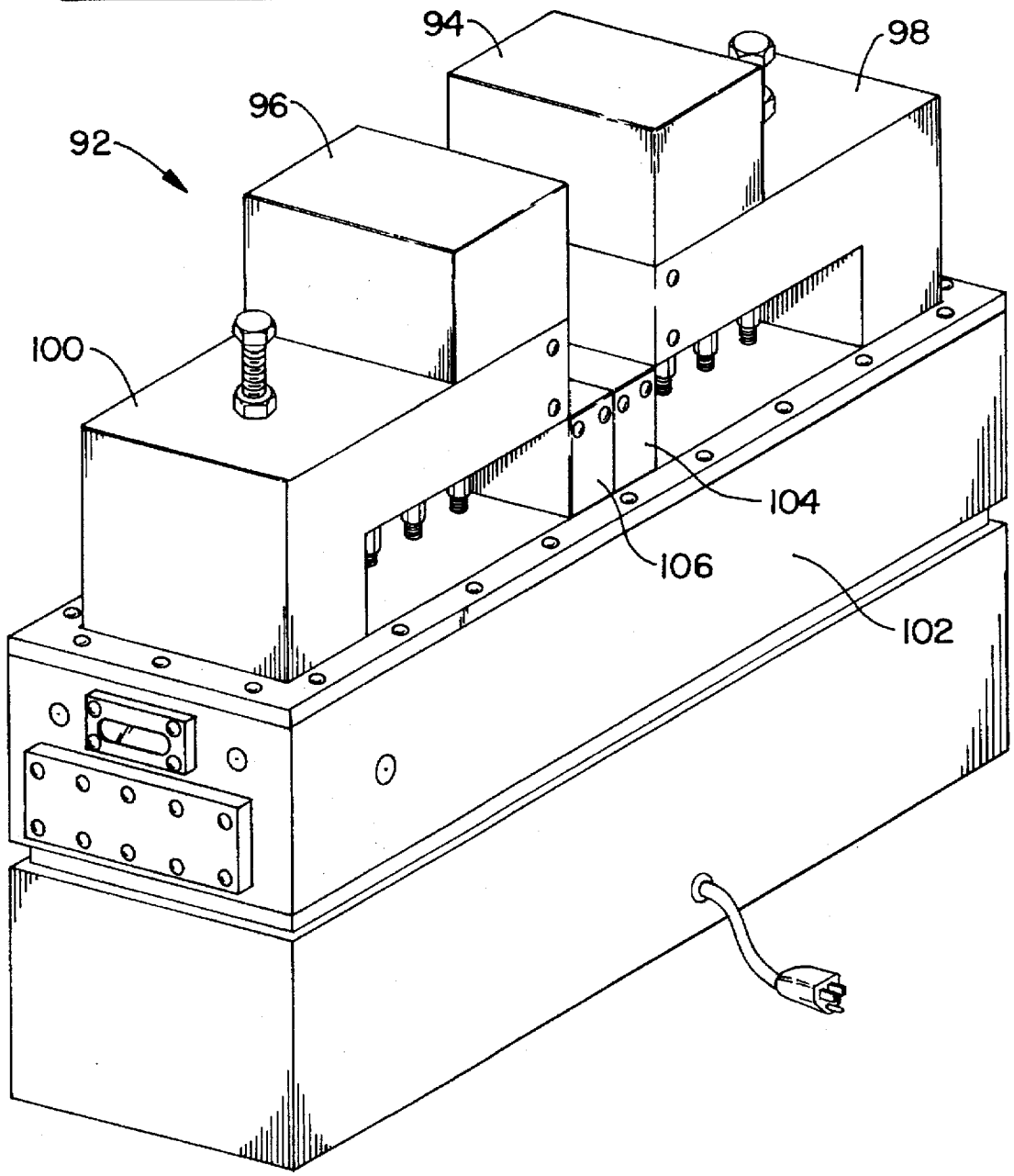
FIG. 6 is a perspective view of a second embodiment of a laser of the present invention.

As shown in FIG. 6, a laser 92 is depicted using a first magnetron 94 and a second magnetron 96. The magnetrons feed microwave energy into a first microwave launcher 98 and a second microwave launcher 100. Each of the microwave launchers feed microwave energy into opposite ends of a waveguide 102. The microwaves propagate from the waveguide 102 into a first terminating cavity 104 and a second terminating cavity 106.

The terminating cavities 104 and 106 prevent short circuiting of the electric field at the end of wall of the waveguide allowing the gas discharge to extend the full length of the waveguide.

Figure 7:
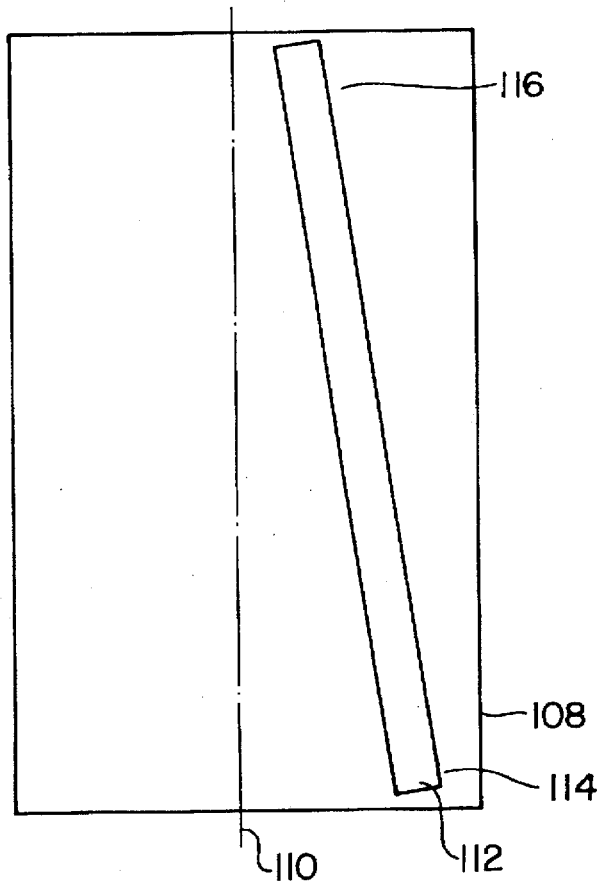
FIG. 7 is a cross sectional top view of a separate embodiment showing a waveguide and gas discharge vessel that is aligned off of the center longitudinal axis.

As shown in FIG. 7, a separate embodiment is disclosed for producing a uniform gas discharge in a dielectric vessel. FIG. 7 shows a waveguide 108 with a waveguide longitudinal axis 110 and a dielectric vessel 112 that is aligned non-parallel with the waveguide longitudinal axis 110. A dielectric vessel first end 114 is aligned farther away from the waveguide longitudinal axis and a dielectric vessel second end 116 is aligned closer to the waveguide longitudinal axis 110.

Referring back to FIG. 5, which depicts the electric voltage across the waveguide, it can be seen that when the dielectric vessel first end 114 is aligned away from the waveguide longitudinal axis 110 at the high power, or magnetron end, that the dielectric vessel first end 114 will not experience the high electrical energy at the waveguide longitudinal axis 110. Similarly, if the dielectric vessel second end 116 is aligned closer to the waveguide longitudinal axis 110 at the terminating end of the waveguide, the dielectric vessel 112 could be exposed to a uniform amount of electrical energy throughout the length of the waveguide, depending on the alignment of the dielectric vessel within the waveguide.

Figure 8:
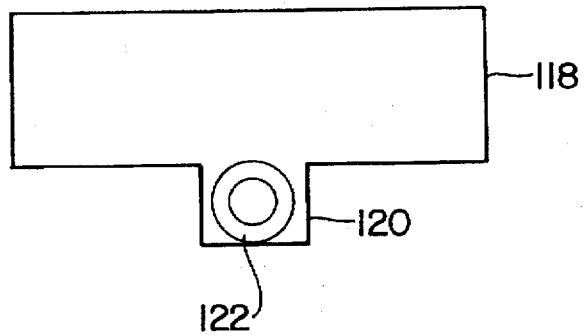
FIG. 8 is a cross sectional view along the width of a waveguide showing a dielectric vessel centered with a waveguide groove.
Figure 9:
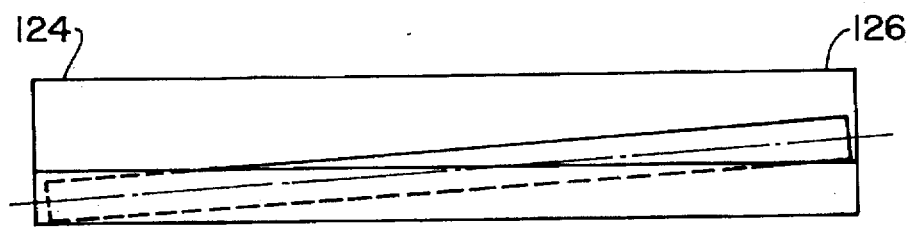
FIG. 9 is a cross sectional view along the length of the waveguide of FIG. 8 showing the dielectric vessel centered with the waveguide groove.

In yet a separate embodiment of the present invention and as shown in FIG. 8 and in FIG. 9, a laser is essentially the same as described in the preferred embodiment except that a waveguide 118 has a groove 120 extending along the length of the waveguide 118. The groove 120 houses a dielectric gas discharge vessel 122 where the gas discharge takes place.

The groove 120 has a slope so that the dielectric gas discharge vessel is totally or mostly shielded from the magnetron electrical energy at a magnetron end 124 and the dielectric gas discharge vessel 122 is only partially shielded or not shielded at all at a terminating cavity end 126.

The groove 120 has a slope to effectively expose the dielectric gas discharge vessel 122 to a uniform electrical field along the length of the waveguide 118 so that a uniform gas discharge occurs internal of the dielectric vessel 122.

Figure 10:
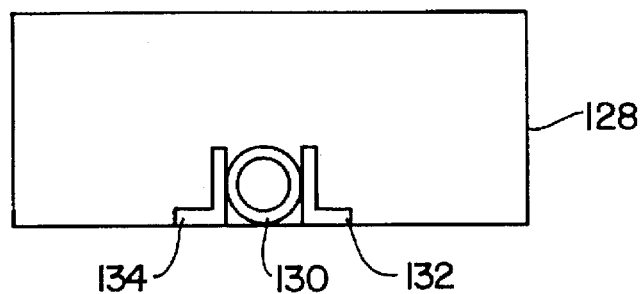
FIG. 10 is a cross sectional view along the width of a waveguide showing a dielectric vessel centered with a pair of opposing shields.
Figure 11:
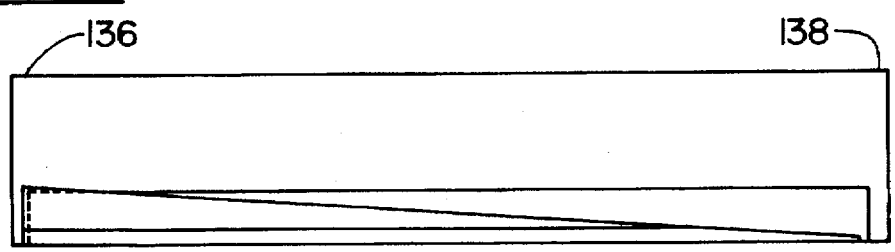
FIG. 11 is a cross sectional view along the length of the waveguide of FIG. 10 showing the dielectric vessel centered with the pair of opposing shields.

In yet a separate embodiment of the present invention and as shown in FIG. 10 and in FIG. 11, a laser is essentially the same as described in the preferred embodiment except that a waveguide 128 has a dielectric gas discharge vessel 130 that is shielded by a first shield 132 and a second shield 134. The shields 132 and 134 have a slope so that the dielectric vessel is totally or mostly shielded from the magnetron electrical energy at a magnetron end 136 and the dielectric vessel 130 is only partially shielded or not shielded at all at a terminating cavity end 138.

The shields 132 and 134 are adjacent and parallel to the dielectric vessel 130. The shields 132 and 134 may be securely fastened to the waveguide, or may positioned in a groove so that the shields and slope may be adjusted along the length of the dielectric gas discharge vessel 130.

The shields 132 and 134 have a slope to effectively expose the dielectric gas discharge vessel 130 to a uniform electrical field along the length of the waveguide 136 so that a uniform gas discharge occurs internal of the dielectric gas discharge vessel 130.

The shields 132 and 134 may also be used to keep the dielectric gas discharge vessel 130 axially aligned while the vessel 130 is exposed to heat and would typically thermally deform.

Figure 12:
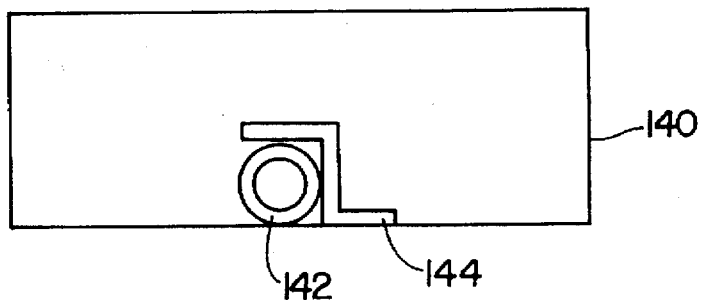
FIG. 12 is a cross sectional view along the width of a waveguide showing a dielectric vessel aligned with a shield.
Figure 13:
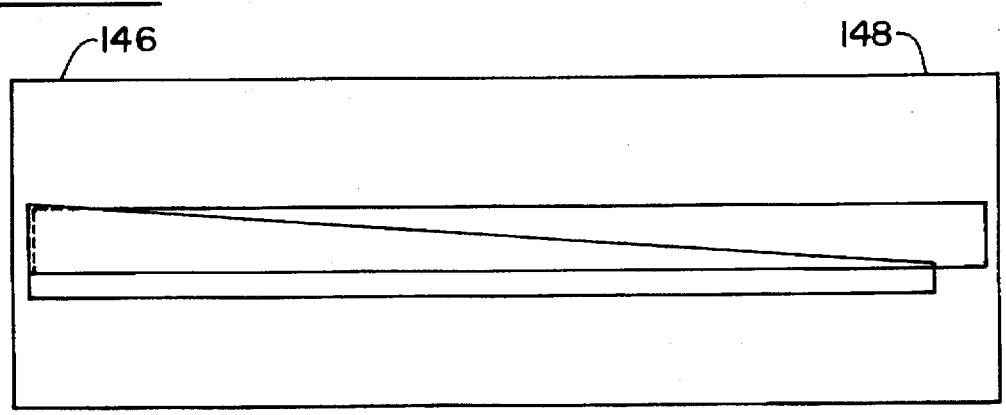
FIG. 13 is a cross sectional top view along the length of the waveguide showing the dielectric vessel aligned with the shield.

In yet a separate embodiment of the present invention and as shown in FIG. 12 and in FIG. 13, a laser is essentially the same as described in the preferred embodiment except that a waveguide 140 has a dielectric gas discharge vessel 142 that is shielded by a shield 144. FIG. 13 is a cross sectional top view of the waveguide 140. The shield is shaped so that it may be securely fastened to the waveguide 140 and effectively shield the dielectric gas discharge vessel 142. In this embodiment the shield 144 has a "Z" configuration; however, other configurations may accomplish the same objective.

The shield 144 has a slope so that the dielectric gas discharge vessel 142 is totally or mostly shielded from the magnetron electrical energy at a magnetron end 146 and the dielectric gas discharge vessel 142 is only partially shielded or not shielded at all at a terminating cavity end 148.

The shield 144 is adjacent and parallel to the dielectric gas discharge vessel 142. The shield 144 may be securely fastened to the waveguide, or may positioned in a groove so that the shields and slope may be adjusted along the length of the dielectric gas discharge vessel 142.

The shield 144 has a slope to effectively expose the dielectric gas discharge vessel 142 to a uniform electrical field along the length of the waveguide 140 so that a uniform gas discharge occurs internal of the dielectric vessel 142.

Although this invention has been shown and described with respect to a detailed embodiment, those skilled in the art will understand that various changes in form and detail may be made without departing from the spirit and scope of the claimed invention.

We claim:

1. A microwave excited laser, comprising:

at least one gas discharge vessel containing a gas mixture as the laser medium;

means for creating an electrical field in the discharge vessel; and means to adjust the intensity of the electrical field in the discharge vessel to provide a uniform discharge throughout the length of the laser.

2. The laser of claim 1, wherein the gas mixture further comprises carbon dioxide.

3. The laser of claim 1, wherein the means for providing uniform discharge throughout the length of the laser further comprises:

an ignitor for initializing the discharge in the laser.

4. The laser of claim 1, wherein the laser further comprises:

means for terminating the microwave energy so that there is a microwave electric field along the full length of the laser.

5. The laser of claim 1, wherein the means to adjust the intensity of the electrical field in the discharge vessel to provide a uniform discharge throughout the length of the laser further comprises:

at least one actuator that adjusts the intensity of the electrical field in each gas discharge vessel.

6. The laser of claim 5, wherein the actuators are positioned along the length of each gas discharge vessel.

7. The laser of claim 5, wherein each actuator is adjustable so that the intensity of the electric field is adjustable at each gas discharge vessel.

8. The laser of claim 5, wherein each gas discharge vessel is housed in a waveguide having a longitudinal axis and a deformable waveguide wall; each gas discharge vessel being aligned axially with each waveguide longitudinal axis and each actuator being adjustable so that each actuator displaces the deformable waveguide wall in relation to the gas discharge vessel to adjust the amount of electrical coupling at the gas discharge vessel.

9. The laser of claim 8, wherein a plurality of axially aligned blocks extend from the deformable wall toward the gas discharge vessel forming an internal ridge, the internal ridge being parallel with and adjacent to the gas discharge vessel so that the actuators displace the deformable wall and the internal ridge in relation to the gas discharge vessel.

10. The laser of claim 9, further comprising flexible foil stock being securely attached to each block so that there is a smooth transition and an electrical connection between each block.

11. The laser of claim 5, wherein the actuators are electrically controlled and adjusted.

12. The laser of claim 5, wherein the waveguide is dimensioned so that the waveguide is at, or slightly above, the electrical cut-off point.

13. The laser of claim 5, wherein the actuators further comprise:

an actuator first end and an actuator second end;

the actuator first end comprising an actuator first threaded portion and the actuator second end comprising an actuator second threaded portion;

a threaded coupling portion connecting and engaging the actuator first threaded portion and the actuator second threaded portion;

a waveguide support bar being external of and extending longitudinally along each waveguide;

each actuator first threaded portion being fixedly attached to the support bar and each actuator second threaded portion being fixedly attached to the waveguide deformable wall.

14. The laser of claim 5, wherein each waveguide further comprises:
a longitudinal waveguide groove being parallel with the waveguide longitudinal axis so that each gas discharge vessel is housed in a longitudinal waveguide recess.

15. The laser of claim 5, wherein each waveguide further comprises:
a plurality of gas discharge vessel securing members made of a dielectric material, the securing members being securely fastened internal of the waveguide so that the gas discharge vessel remains axially aligned.

16. The laser of claim 1, wherein the means to adjust the intensity of the electrical field in the discharge vessel to provide a uniform discharge throughout the length of the laser further comprises:
a microwave waveguide having a first end at a magnetron portion end and a second end at a terminating cavity portion end, the microwave waveguide having a central longitudinal axis, the first end being exposed to a higher electrical field than the second end, each gas discharge vessel being housed in one waveguide;
each gas discharge vessel further comprising a dielectric tube located in each waveguide, each dielectric tube having a first end and a second end, the dielectric tube first end being located at the waveguide first end, the dielectric tube first end being offset from the central axis at the waveguide first end.

17. The laser of claim 1, wherein the means for providing a uniform discharge throughout the length of the laser further comprises:
a microwave waveguide having a first end at a magnetron portion end and a second end at a terminating cavity portion end, the first end being exposed to a higher electrical field than the second end, the waveguide housing the gas discharge vessel;
each gas discharge vessel comprising a dielectric tube located in each waveguide, each dielectric tube having a first end and a second end, the dielectric tube first end being located at the waveguide first end;
a gas discharge vessel shield located adjacent to each gas discharge vessel, the shield varying in height so that the gas discharge vessel first end is shielded from the electric field and the gas discharge vessel second end is not shielded from the electric field.

18. The laser of claim 1, wherein the means for providing a uniform discharge throughout the length of the laser further comprises:
a microwave waveguide having a first end and a second end, the first end being exposed to a higher electrical field than the second end, the waveguide housing the gas discharge vessel;
each gas discharge vessel comprising a dielectric tube located in each waveguide, each dielectric tube having a first end and a second end, the tube first end being located at the waveguide first end;
the waveguide having a groove for housing the tube, the groove varying in depth so that the tube first end is shielded from the electric field and the tube second end is not shielded from the electric field.

19. The laser of claim 1, wherein the laser further comprises:
means for deforming a waveguide wall to adjust the electric field strength in the discharge vessel to provide a uniform discharge throughout the length of the laser.

20. The laser of claim 1, wherein the means to adjust the intensity of the electrical field in the discharge vessel to provide a uniform discharge throughout the length of the laser further comprises:
a plurality of actuators that adjust the intensity of the electrical field in each gas discharge vessel.

21. A microwave excited laser having a carbon dioxide gas mixture as the laser medium and with at least one gas discharge vessel having a longitudinal axis, the laser having a uniform gas discharge throughout the length of the laser, comprising:
means for terminating the microwave energy so that there is a microwave electric field along the full length of the laser;
a plurality of actuators positioned along the gas discharge vessel longitudinal axis so the actuators may be adjusted to vary the intensity of the electrical field in each gas discharge vessel;
wherein each gas discharge vessel is housed in a waveguide, the waveguide being dimensioned to be at, or slightly above the electrical field cut-off point, the waveguide having a waveguide longitudinal axis and a deformable waveguide wall;
each gas discharge vessel being aligned axially with each waveguide longitudinal axis and each actuator being adjustable so that each actuator displaces the deformable waveguide wall in relation to the gas discharge vessel to adjust the amount of electrical coupling at the gas discharge vessel;
a plurality of axially aligned blocks extend from the deformable wall toward the gas discharge vessel forming an internal ridge, the internal ridge being parallel with and adjacent to the gas discharge vessel so that the actuators displace the deformable wall and the internal ridge in relation to the gas discharge vessel.

22. The laser of claim 21, further comprising flexible foil stock being securely attached to each block so that there is a smooth transition and an electrical connection between each block.

23. The laser of claim 21, wherein the actuators are electrically controlled and adjusted.

24. The laser of claim 21, wherein the actuators further comprise:
an actuator first end and an actuator second end;
the actuator first end comprising an actuator first threaded portion and the actuator second end comprising an actuator second threaded portion;
a threaded coupling portion connecting and engaging the actuator first threaded portion and the actuator second threaded portion;
a waveguide support bar being external of and extending longitudinally along each waveguide;
each actuator first threaded portion being fixedly attached to the support bar and each actuator second threaded portion being fixedly attached to the waveguide deformable wall.

25. The laser of claim 21, wherein each waveguide further comprises:
a longitudinal waveguide groove being parallel with the waveguide longitudinal axis so that each gas discharge vessel is housed in a longitudinal waveguide recess.

26. The laser of claim 21, wherein each waveguide further comprises:

a plurality of gas discharge vessel securing strips made of a dielectric material, the securing strips being securely fastened internal of the waveguide so that the gas discharge vessel remains axially aligned.

27. A method of producing a uniform discharge throughout the length of a laser, comprising:
providing a transverse electrical field from microwave energy in at least one microwave cavity, each microwave cavity housing a gas discharge vessel with a laser medium, each microwave cavity being dimensioned to be at or slightly above cut-off;
exciting the laser medium with the transverse electrical field;
adjusting the electrical field along the length of the gas discharge vessel.

28. The method of claim 27, wherein adjusting the electric field along the length of the gas discharge vessel is accomplished by a plurality of actuators that displace a deformable wall of a waveguide, the waveguide housing the gas discharge vessel.

29. The method of claim 27, wherein the method further comprises:
terminating the electrical field in a terminating cavity.

30. The method of claim 29, wherein the terminating cavity is located adjacent to a microwave cavity and the laser a output.

31. The method of claim 29, wherein the terminating cavity may be adjusted to tune a microwave electric field through a waveguide.

32. The method of claim 27, wherein the method further comprises:
starting the discharge process by momentarily adjusting the electrical field at one location along the gas discharge vessel near the microwave energy source to have a strong electrical field at that location.

* * * * *